(12) United States Patent
Maruyama et al.

(10) Patent No.: US 12,487,131 B2
(45) Date of Patent: Dec. 2, 2025

(54) TEMPERATURE MEASUREMENT DEVICE, TEMPERATURE MEASUREMENT METHOD, AND TEMPERATURE ATTENUATION MEASUREMENT METHOD

(71) Applicants: SEMITEC Corporation, Tokyo (JP); National Institute of Technology, Tokyo (JP); HIROSAKI UNIVERSITY, Aomori (JP)

(72) Inventors: Shigenao Maruyama, Aomori (JP); Takahiro Okabe, Aomori (JP); Yuya Iseki, Aomori (JP); Takashi Nonaka, Aomori (JP); Takuma Kogawa, Aomori (JP); Yasushi Hosokawa, Aomori (JP); Yutaro Tabata, Tokyo (JP); Tadashi Matsudate, Tokyo (JP); Toshinori Nakajima, Tokyo (JP); Masaya Higashi, Tokyo (JP); Manabu Orito, Tokyo (JP)

(73) Assignees: SEMITEC Corporation, Tokyo (JP); National Institute of Technology, Tokyo (JP); HIROSAKI UNIVERSITY, Aomori (JP)

( * ) Notice: Subject to any disclaimer, the term of this patent is extended or adjusted under 35 U.S.C. 154(b) by 232 days.

(21) Appl. No.: 18/010,198

(22) PCT Filed: Jun. 15, 2021

(86) PCT No.: PCT/JP2021/022647
§ 371 (c)(1),
(2) Date: Dec. 13, 2022

(87) PCT Pub. No.: WO2021/261327
PCT Pub. Date: Dec. 30, 2021

(65) Prior Publication Data
US 2023/0296447 A1   Sep. 21, 2023

(30) Foreign Application Priority Data

Jun. 23, 2020  (JP) .................................. 2020-107686

(51) Int. Cl.
G01K 7/22   (2006.01)
G01K 1/12   (2006.01)
G01K 1/143  (2021.01)

(52) U.S. Cl.
CPC .............. G01K 7/226 (2013.01); G01K 1/12 (2013.01); G01K 1/143 (2013.01)

(58) Field of Classification Search
CPC .......... G01K 7/226; G01K 1/12; G01K 1/143
See application file for complete search history.

(56) References Cited

U.S. PATENT DOCUMENTS 6,839,651 B2 *  1/2005  Lantz ...................... G01K 7/42
                                                 374/E7.042
2001/0053882 A1 * 12/2001 Haddock .............. A61B 5/6885
                                                 600/549

(Continued)

FOREIGN PATENT DOCUMENTS

CN       102221415       10/2011
GB       2266771 A  *   11/1993   ............... G01K 1/16

(Continued)

OTHER PUBLICATIONS

"International Search Report (Form PCT/ISA/210) of PCT/JP2021/022647," mailed on Jul. 21, 2021, with English translation thereof, pp. 1-4.

(Continued)

*Primary Examiner* — Kyung S Lee
(74) *Attorney, Agent, or Firm* — JCIPRNET

(57) ABSTRACT

A temperature measurement device (10) comprises: a thermosensitive unit (41) that senses temperature; a thin film thermosensitive element (1) for measurement capable of (Continued)

measuring the temperature by bringing the thermosensitive unit (41) into contact with a subject; a thin film thermosensitive element (2) for protective heating disposed to enable heat exchange with the thin film thermosensitive element (1) via an insulating layer (S1), and controlled so that the temperature thereof is equal to the temperature of the thin film thermosensitive element (1); a temperature control element (3) capable of causing the thin film thermosensitive element (1) to be in a temperature state in which the temperature thereof is a certain degree lower than the temperature of the subject; and a control processing unit (5) controlling the thin film thermosensitive element (1), the thin film thermosensitive element (2), and the temperature control element (3).

11 Claims, 8 Drawing Sheets

(56) References Cited

U.S. PATENT DOCUMENTS

| | | | | |
|---|---|---|---|---|
| 2004/0076215 | A1* | 4/2004 | Baumbach | G01K 1/165 |
| | | | | 374/E7.042 |
| 2005/0223721 | A1 | 10/2005 | Kirby et al. | |
| 2011/0249701 | A1* | 10/2011 | Bieberich | G01K 13/20 |
| | | | | 374/163 |
| 2012/0238901 | A1 | 9/2012 | Augustine | |
| 2014/0278201 | A1* | 9/2014 | Shimizu | G01K 7/427 |
| | | | | 702/131 |
| 2015/0204733 | A1* | 7/2015 | Newell | G01K 7/16 |
| | | | | 374/141 |
| 2024/0068884 | A1* | 2/2024 | Maruyama | G01K 1/16 |

FOREIGN PATENT DOCUMENTS

| | | |
|---|---|---|
| JP | H0862010 | 3/1996 |
| JP | 2004526147 | 8/2004 |
| JP | 2005515795 | 6/2005 |
| JP | 2006300765 | 11/2006 |
| JP | 2009079965 | 4/2009 |
| JP | 2013527434 | 6/2013 |
| JP | 5327840 | 10/2013 |
| JP | 2016217885 | 12/2016 |
| WO | 2009034999 | 3/2009 |
| WO | WO-2017198788 A1 * 11/2017 | ........... A61B 5/0002 |

OTHER PUBLICATIONS

Takahiro Okabe et al., "First-in-human clinical study of novel technique to diagnose malignant melanoma via thermal conductivity measurements", Scientific Reports, Mar. 7, 2019, pp. 1-7.

Takahiro Okabe et al., "Non-invasive measurement of effective thermal conductivity of human skin with a guard-heated thermistor probe", International Journal of Heat and Mass Transfer, Nov. 2018, pp. 625-635.

Takahiro Okabe et al., "Development of a guard-heated thermistor probe for the accurate measurement of surface temperature", International Journal of Heat and Mass Transfer, May 2017, pp. 2283-2292.

"Office Action of China Counterpart Application", issued on Apr. 24, 2025, with English translation thereof, p. 1-p. 14.

* cited by examiner

TEMPERATURE MEASUREMENT DEVICE, TEMPERATURE MEASUREMENT METHOD, AND TEMPERATURE ATTENUATION MEASUREMENT METHOD

CROSS-REFERENCE TO RELATED APPLICATION

This application is a 371 application of the International PCT application serial no. PCT/JP2021/022647, filed on Jun. 15, 2021, which claims the priority benefits of Japan Patent Application No. 2020-107686, filed on Jun. 23, 2020. The entirety of each of the above-mentioned patent applications is hereby incorporated by reference herein and made a part of this specification.

TECHNICAL FIELD

The invention relates to a temperature measurement device, a temperature measurement method, and a temperature attenuation measurement method.

RELATED ART

In industrial and medical fields, it is desired to measure the surface temperature of an object with high precision, high accuracy, and rapid response.

For example, in medical fields, the diagnosis for a suspected malignant skin tumor starts by observation of the appearance and palpation, and a portion of the affected area is excised for pathological determination. For skin cancer, represented by melanoma (malignant melanoma), the cure rate is high if detected at an early stage. However, as the skin cancer progresses, the cure rate drops significantly. The diagnosis often involves visual inspection using a dermascope, but such diagnosis requires skill.

Specifically, in the case where a malignant skin tumor is suspected, although pathological inspection is performed through skin biopsy, such skin biopsy is invasive, and it takes time until the inspection result comes out. In addition, actinic keratosis, which is an intraepidermal carcinoma, progresses to squamous cell carcinoma over time and may lead to multiple organ metastases, and screening may be required. Therefore, early detection as well as treatment are desired, and a non-invasive diagnostic method for skin cancer is required.

Under such circumstance, a temperature measurement device capable of diagnosing skin cancer in a non-invasive manner has been proposed (see Patent Document 1). The temperature measurement device disclosed in Patent Document 1 causes a protective heat source sensor to heat to the same temperature as a temperature measuring sensor, etc. Accordingly, since the temperature of the surface of the measurement target and the temperature of the temperature measurement sensor and the protective heat source sensor are equal, heat can be prevented from being transferred from the temperature measurement sensor to the protective heat source sensor and from the surface of the measurement target to the temperature measurement sensor. Therefore, it is possible to precisely and accurately measure the temperature by using the temperature measurement sensor. Furthermore, Patent Document 1 discloses to measure the thermal conductivity of the affected area by applying a certain heat amount to the measurement sensor in a pulsed manner.

CITATION LIST

Patent Literature

Patent Document 1: Japanese Laid-open No. 2016-217885
Patent Document 2: Japanese Laid-open No. 2006-300765
Patent Document 3: Japanese Patent No. 5327840
Non-patent Document 1: First-in-human clinical study of novel technique to diagnose malignant melanoma via thermal conductivity measurements,T. Okabe, T.Fujimura, J.Okajima, Y.Kambayashi, S.Aiba, S.Maruyama, Scientific Reports, Vol.9,(2019).
Non-patent Document 2: Non-invasive measurement of effective thermal conductivity of human skin with a guard-heated thermistor probe, T.Okabe, T.Fujimura, J.Okajima, S.Aiba, S.Maruyama, International Journal of Heat and Mass Transfer, Vol.126,(2018).
Non-patent Document 3: Development of a guard-heated thermistor probe for the accurate measurement of surface temperature, T.Okabe, J.Okajima, A.Komiya, S.Maruyama, International Journal of Heat and Mass Transfer, Vol.108, (2017).

SUMMARY OF INVENTION

Technical Problem

However, the temperature measurement sensor and the protective heat source sensor in Patent Document 1 are glass-filled NTC thermistors, and have a large heat capacity and limited temperature responsiveness, making it difficult to expect a rapid response. Moreover, in principle, for a relationship between the surface temperature of the measurement target and the environment temperature, a relationship that the temperature of the temperature measurement sensor, that is, the ambient temperature, is lower than the surface temperature of the measurement target is required.

According to the embodiments of the invention, an objective is to provide a temperature measurement device, a temperature measurement method, and a temperature attenuation measurement method which are capable of precisely and accurately measuring the temperature of a measurement target with rapid response, and are capable of retaining the temperature of a thin film thermosensitive element for measurement to a temperature lower than the temperature of the measurement target.

Solution to Problem

A temperature measurement device according to an embodiment of the invention includes: a thermosensitive part, sensing a temperature; a thin film thermosensitive element for measurement, able to measure a temperature by bringing the thermosensitive part into contact with a measurement target; a thin film thermosensitive element for protective heating, disposed, with of a heat insulating layer being interposed, to be able to exchange heat with the thin film thermosensitive element for measurement, and controlled so as to be equal to the thin film thermosensitive element for measurement in temperature; a temperature control element, able to set the thin film thermosensitive element for measurement to a temperature state at a temperature that is a certain degree lower than a temperature of the measurement target; a control process part, controlling the thin film thermosensitive element for measurement, the thin film thermosensitive element for protective heating, and the temperature control element.

The temperature measurement device according to the embodiment is capable of precisely and accurately measuring the temperature of the measurement target with rapid response, and is capable of retaining the temperature of the thin film thermosensitive element for measurement to a temperature lower than the temperature of the measurement target. Although the temperature measurement device is suitably applied to a living body, the invention is not limited thereto. The temperature measurement device is also applicable to the case of measuring the surface temperature of an object in industrial fields, and the measurement target is not particularly limited.

In a temperature measurement method according to an embodiment of the invention, a thermosensitive part sensing a temperature, a thin film thermosensitive element for measurement able to measure a temperature, a thin film thermosensitive element for protective heating disposed, with a heat insulating layer being interposed, with respect to the thin film thermosensitive element for measurement, and a temperature control element able to control a temperature of the thin film thermosensitive element for measurement are provided, and the temperature measurement method includes: a step of controlling, by using the temperature control element, the temperature of the thin film thermosensitive element for measurement to a temperature that is a certain degree lower than a measurement target; a step of bringing the thermosensitive part into contact with the measurement target; a step of exerting control so that the temperature of the thin film thermosensitive element for measurement and a temperature of the thin film thermosensitive element for protective heating are equal; and a step of outputting a measurement result of a temperature of the measurement target.

Also, in a temperature attenuation measurement method according to an embodiment of the invention, a thermosensitive part sensing a temperature, a thin film thermosensitive element for measurement able to measure a temperature, a thin film thermosensitive element for protective heating disposed, with a heat insulating layer being interposed, with respect to the thin film thermosensitive element for measurement, and a temperature control element able to control a temperature of the thin film thermosensitive element for measurement are provided, and the temperature attenuation measurement method includes: a step of bringing the thermosensitive part into contact with the measurement target; a step of applying a first thermal pulse of certain power to the thin film thermosensitive element for measurement; a step of detecting a temperature attenuation property of the thin film thermosensitive element for measurement within a predetermined time after application of the first thermal pulse stops; a step of applying a second thermal pulse of certain power with a duration longer than the first thermal pulse to the thin film thermosensitive element for measurement; and a step of detecting a temperature attenuation property of the thin film thermosensitive element for measurement within a predetermined time after application of the second thermal pulse stops.

According to the temperature attenuation measurement method according to the embodiment, for example, by detecting the temperature attenuation properties from the epidermis to the dermis of the living body to calculate the thermal conductivity, the affected area can be diagnosed in a non-invasive manner.

Effects of Invention

The embodiments of the invention provide a temperature measurement device, a temperature measurement method, and a temperature attenuation measurement method which are capable of precisely and accurately measuring the temperature of a measurement target with rapid response, and are capable of retaining the temperature of a thin film thermosensitive element for measurement to a temperature lower than the temperature of the measurement target.

DESCRIPTION OF EMBODIMENTS

First Embodiment

Figure 1:
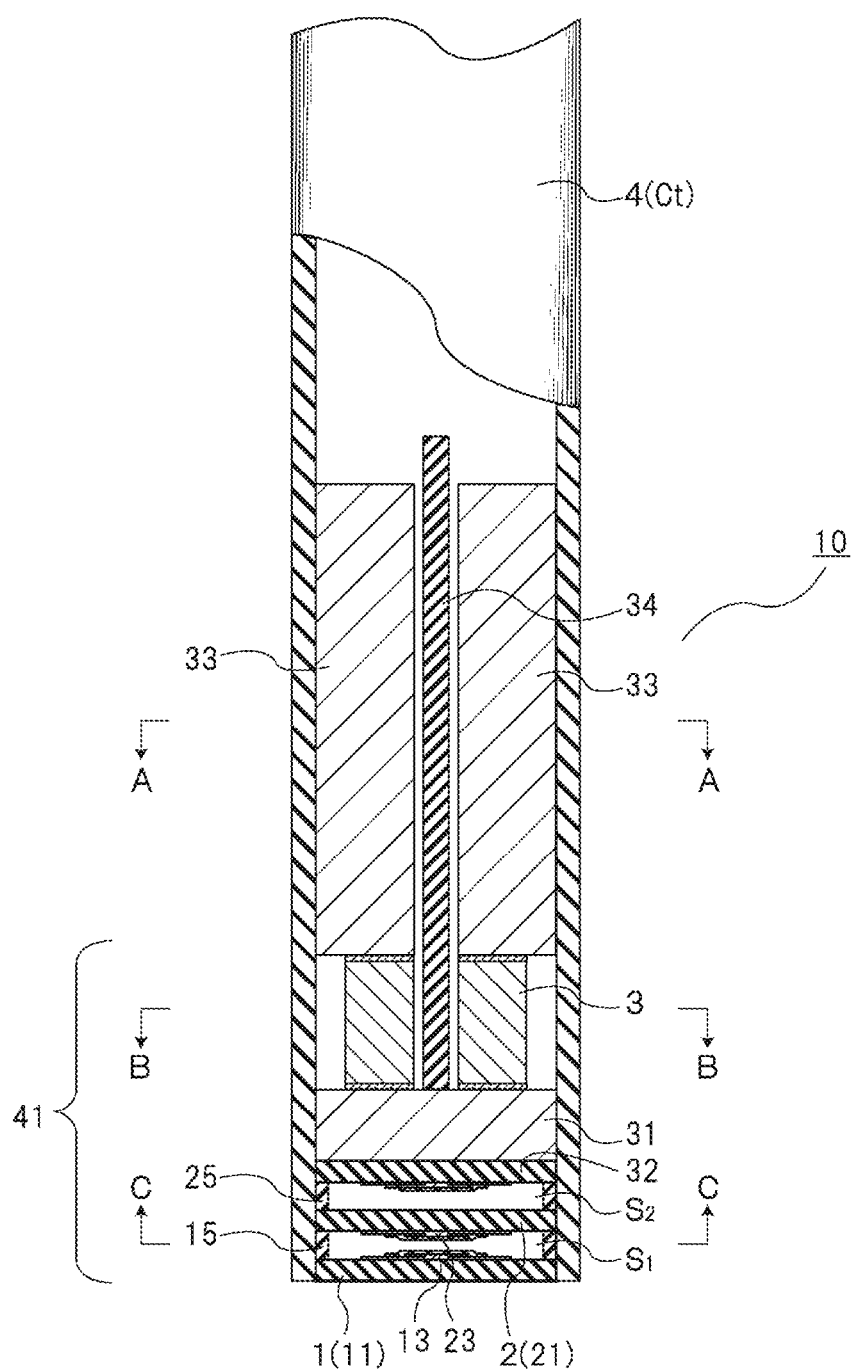
FIG. 1 is a longitudinal cross-sectional view illustrating a temperature measurement device according to a first embodiment of the invention.
Figure 2:
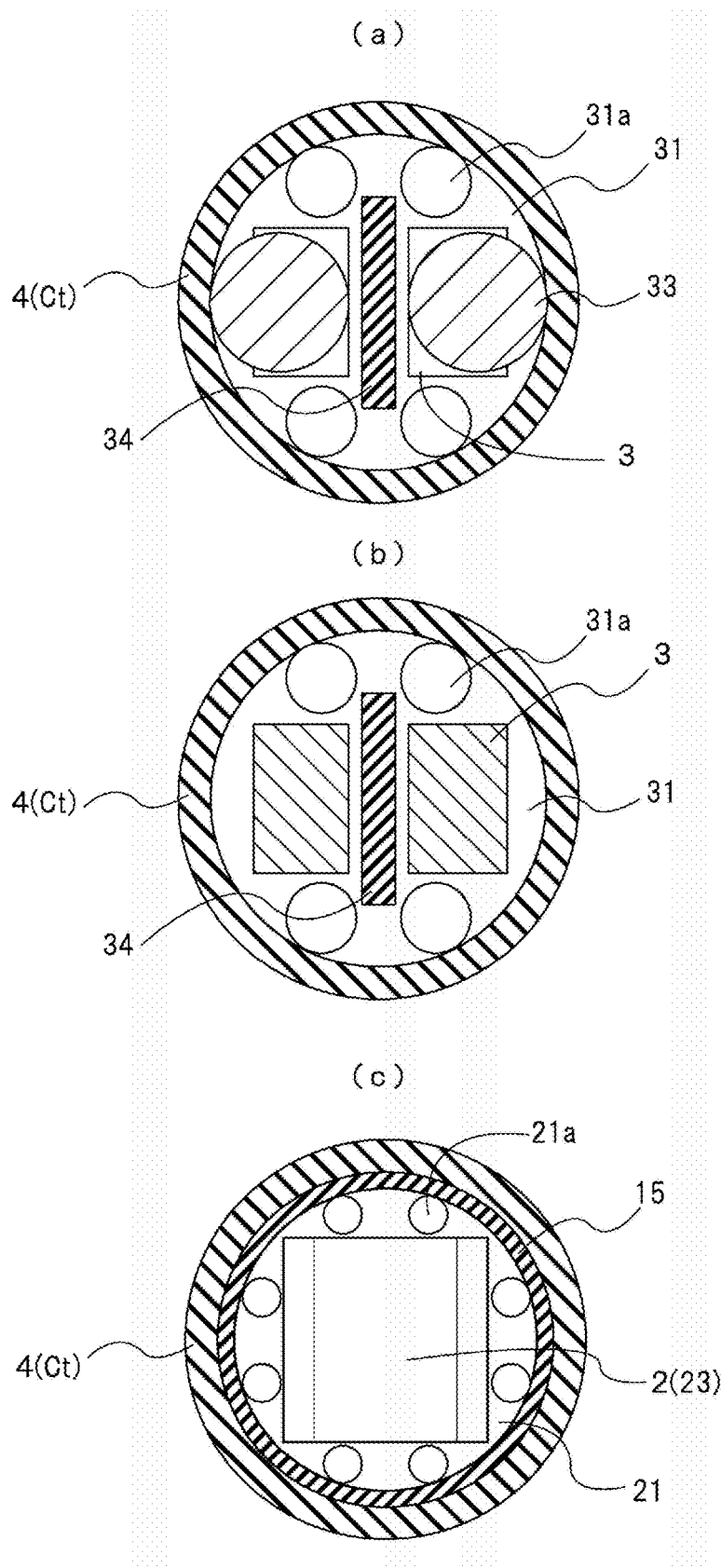
In FIG. 2, (a) is a cross-sectional view taken along line A-A in FIG. 1, (b) is a cross-sectional view taken along line B-B in FIG. 1, and (c) is a cross-sectional view taken along line C-C in FIG. 1.
Figure 3:
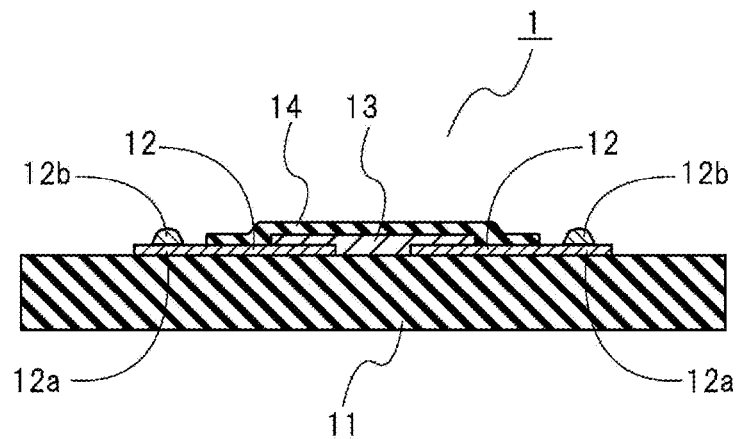
FIG. 3 is a cross-sectional view illustrating a thin film thermosensitive element.
Figure 4:
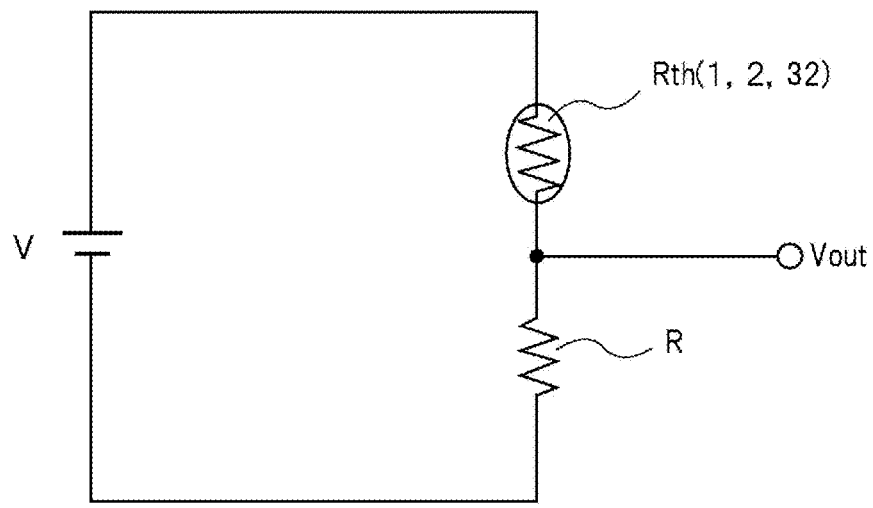
FIG. 4 is a wiring diagram illustrating a basic connection state of the thin film thermosensitive element.
Figure 5:
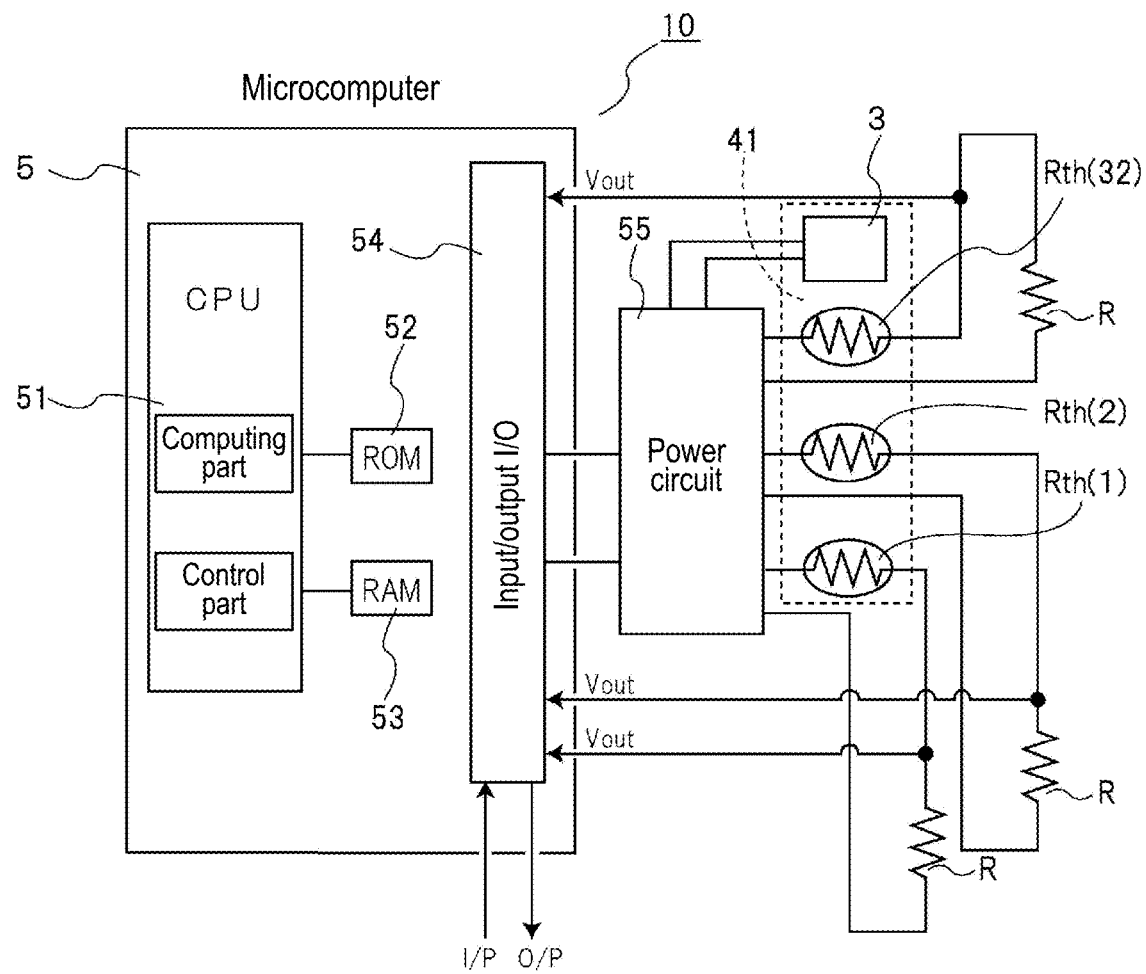
FIG. 5 is a block configuration diagram illustrating the temperature measurement device.
Figure 6:
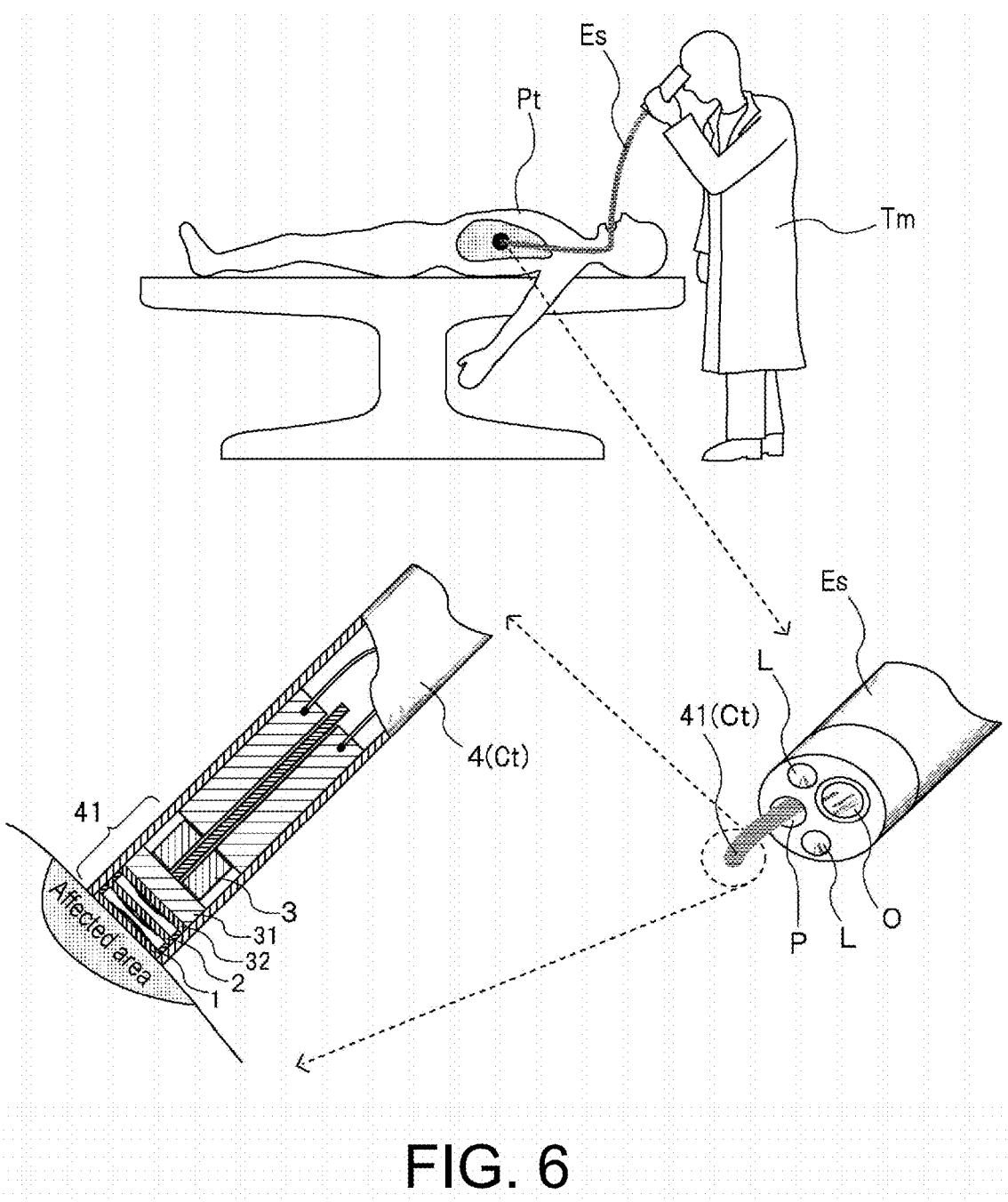
FIG. 6 is a diagram illustrating an application example of the temperature measurement device.

In the following, a temperature measurement device according to the first embodiment of the invention is described with reference to FIGS. 1 to 6. FIGS. 1 and 2 are longitudinal and lateral cross-sectional views schematically illustrating a temperature measurement device. FIG. 3 is a cross-sectional view illustrating a thin film thermosensitive element, and FIG. 4 is a wiring diagram illustrating a basic connection state of the thin film thermosensitive element. In addition, FIG. 5 is a block configuration diagram illustrating the temperature measurement device, and FIG. 6 is a diagram illustrating an application example of the temperature measurement device. In the respective figures, the scales of the respective components may be properly modified in order to make the respective components as large as recognizable. In addition, the same or equivalent portions are labeled with the same reference symbols, and the repeated description thereof is omitted.

The temperature measurement device of the embodiment is configured to be suitably incorporated into a catheter, and is capable of precisely and accurately measuring the temperature of a living body as a measurement target with rapid response. FIG. 1 illustrates a state in which a temperature measurement device 10 is incorporated to a tip end part of a catheter Ct. In FIG. 2, (a) is a cross-sectional view taken along line A-A, (b) is a cross-sectional view taken along line B-B, and (c) is a cross-sectional view taken along line C-C. In FIGS. 1 and 2, the illustration of wiring relationships, such as lead wires, is omitted.

The temperature measurement device 10 shown in FIGS. 1 and 2 includes a thin film thermosensitive element 1 for measurement, a thin film thermosensitive element 2 for protective heating, a temperature control element 3, a pipe-shaped outer wall 4 accommodating the respective components, and a control process part 5 (see FIG. 5) controlling the respective components.

In the embodiment, the outer wall 4 is a tubular-shaped shaft of the catheter Ct. The shaft is elongated and formed with a lumen, and exhibits suitable rigidity and flexibility. Also, inside the lumen, a hollow lead-wire insertion tube is arranged along a longitudinal direction. A synthetic resin, such as polyurethane, polyolefin, polyamide, polyether polyamide, can be used in the material forming the shaft. In addition, the outer diameter dimension of the shaft is equal to or less than 8 French (=2.67 mm), and the length dimension thereof is formed to be 900 mm to 1100 mm.

Therefore, the thin film thermosensitive element 1 for measurement, the thin film thermosensitive element 2 for protective heating, and the temperature control part 3 are accommodated and incorporated in the tip end part of the catheter Ct that serves as the outer wall 4, and the tip end part of the catheter Ct serves as a thermosensitive part 41 that senses a temperature and function as a probe.

The thin film thermosensitive element 1 for measurement exhibits substantially the same specification and properties as the thermosensitive element 2 for protective heating to be described afterwards. The thermosensitive element 1 for measurement is the foremost tip end of the shaft of the catheter Ct, and is arranged at an inner diameter portion.

Referring to FIG. 3 as well, the thin film thermosensitive element 1 for measurement is a thin film thermistor, and includes a substrate 11 as well as a conductive layer 12, a thin film element layer 13, and a protective insulating layer 14 formed upon the substrate 11.

The substrate 11 is formed in a substantially circular shape fittable with the inner diameter portion of the catheter Ct, and is formed by an insulating alumina material. For the material forming the substrate 11, ceramics such as aluminum nitride and zirconia or semiconductors such as silicon and germanium may be used. On a surface of the substrate 11 (upper side in the drawing), an insulating thin film is formed by sputtering, etc. The substrate 11 is ultra thin, and a thickness thereof is 200 µm or less, specifically 50 µm to 200 µm, and more specifically 150 µm or less.
By using such ultra thin substrate 11 for a thin film thermistor, it is possible to realize a thermosensitive element having a small heat cavity, high sensitivity, and excellent thermal responsiveness.

The conductive layer 12 forms a wiring pattern, and is formed on the substrate 11. The conductive layer 12 is formed by forming a metal thin film by sputtering, etc., and in the metal material thereof, a precious metal, such as platinum (Pt), gold (Au), silver (Ag), palladium (Pd), or an alloy of the previous metals, such as an Ag—Pd alloy, is used. In addition, at two ends of the substrate 11, a pair of electrode parts 12a electrically connected with the conductive layer 12 are integrally formed with the conductive layer 12.

The thin film element layer 13 is a thermistor composition, and is formed from an oxide semiconductor having a negative temperature coefficient. The thin film element layer 13 is formed on the conductive layer 12 by sputtering, and electrically connected to the conductive layer 12. The thin film element layer 13 may also be formed by an oxide semiconductor having a positive temperature coefficient.

The thin film element layer 13, for example, is formed by two or more elements selected from transition metal elements such as manganese (Mn), nickel (Ni), cobalt (Co), iron (Fe). The protective insulating layer 14 is formed to cover the thin film element layer 13 and the conductive layer 12. The protective insulating layer 14 is a protective glass layer formed by borosilicate glass.

In addition, a lead wire 12b made by metal is bonded and electrically connected to the electrode part 12a through welding. Specifically, the lead wire 12b is formed from a material with low thermal conductivity such as Constantan® or Hastelloy® (registered trademark), and the thermal conductivity thereof may be 5 W/m·K to 25 W/m·K. These materials can be connected by using a brazing material such as solder, or by laser welding. In addition, the wire diameter of the lead wire 12b may be about φ 20 µm to about φ 100 µm. By arranging the lead wire 12b in this way, the thermal capacity and the thermal dissipation amount of the thermistor due to the lead wire 12b are reduced, and the sensitivity and the thermal response can be facilitated.

The other side (the lower side that is the side of the measurement target in the figure) of the substrate 11 may also be covered by a protective film. In such case, the thin film thermosensitive element 1 for measurement contacts the measurement target via the protective film.

In addition, it may also be that the thin film thermosensitive element 1 for measurement is arranged at the inner diameter portion of the catheter Ct, so that the thin film element layer 13 is disposed on the other side of the substrate 11. In such case, the side of the thin film element layer 13 of the thin film thermosensitive element 1 for measurement is further covered by a protective film, and the thin film thermosensitive element 1 for measurement, more specifically, the side of the thin film element layer 13, is configured to contact the measurement target via the protective film.

The thin film thermosensitive element 2 for protective heating is an element same as the thin film thermosensitive element 1 for measurement, and exhibits the same specification and properties. Therefore, the portion same as or equivalent to the thin film thermosensitive element 1 for measurement is labeled with the same or equivalent symbol, and detailed description will be omitted.

As mainly shown in (c) of FIG. 2, the thin film thermosensitive element 2 for protective heating has a thin film element layer 23, and multiple holes 21a for passing of lead wires, specifically eight holes 21a, are formed on the periphery of the substrate 21. Lead wires of the thin film thermosensitive element 1 for measurement and the thin film thermosensitive element 2 for protective heating are inserted through the holes 21a to be guided to the side of the control process part 5. In addition, the holes 21a are formed in linear symmetry. Therefore, it is possible to maintain favorable thermal balance.

In addition, as shown in FIG. 1, the thin film thermosensitive element 2 for protective heating is disposed, with a heat insulating layer $S_1$ being interposed, along the longitudinal direction of the catheter Ct to be able to exchange heat with the thin film thermosensitive element 1 for measurement. In addition, the thin film thermosensitive element 1 for measurement and the thin film thermosensitive element 2 for protective heating are disposed so that the sides of the thin film element layers 13, 23 face each other.

The heat insulating layer $S_1$ is a gas layer, specifically an air layer, and through a ring-shaped heat insulating spacer 15 provided between the thin film thermosensitive element 1 for measurement and the thin film thermosensitive element 2 for protective heating, an interval therebetween is maintained. The layer thickness dimension of the heat insulating layer $S_1$ is set at a fine interval of 0.05 mm to 1 mm. By setting such layer thickness dimension, the heat transferred from the thin film thermosensitive element 1 for measurement to the thin film thermosensitive element 2 for protective heating can be suppressed to maintain proper heat insulating properties, whereas heat exchange between the thin film thermosensitive element 1 for measurement and the thin film thermosensitive element 2 for protective heating is enabled to be able to make the temperatures of the thin film thermosensitive element 1 for measurement and the thin film thermosensitive element 2 for protective heating equal. Although the heat insulating layer $S_1$ may be an air layer, the heat insulating layer $S_1$ may also be a gas layer of nitrogen, argon, etc., and can also be formed by a heat insulating material.

The temperature control element 3 is a Peltier element that is a thermoelectric element. The Peltier element makes use of the Peltier effect, and is a semiconductor element in which a surface serves as a heat absorbing surface and the other surface serves as a heat dissipation surface when a direct current flows through. By reversing the current direction, the heat absorbing surface and the heat dissipation surface are reversed.

In addition, the temperature control element 3 is arranged on the rear end side of the thin film thermosensitive element 1 for measurement, the thin film thermosensitive element 2 for protective heating. In addition, a heat sink 31 and thin film thermosensitive element 32 for the temperature control element are provided on the tip end side of the temperature control element 3, and a heat dissipation fin 33 is arranged on the rear end side of the temperature control element 3.

Referring to also (b) of FIG. 2, the heat sink 31 is formed in a short cylindrical shape by using metal with favorable thermal conductivity, such as copper, aluminum, brass, or iron, and is disposed to be thermally coupled to the surface of the Peltier element.

In addition, the thin film thermosensitive element 32 for the temperature control element is disposed to be thermally coupled to the heat sink 31. The thin film thermosensitive element 32 for the temperature control element senses the temperature of the heat sink 31, and functions to control the temperature of a Peltier module formed from the Peltier element as the temperature control element 3. Therefore, the heat sink 31 is set to a temperature that is a certain degree lower, and the ambient temperature is lowered. Accordingly, it is possible to retain the thin film thermosensitive element 1 for measurement in a temperature state at a temperature that is a certain degree lower than the temperature of the measurement target.

On the periphery of the heat sink 31, multiple holes 31a, specifically four holes 31a, of lead wires are formed. In addition, for communication with the holes 31a, holes not shown herein are formed on the periphery of the substrate of the thin film thermosensitive element 32 for the temperature control element. Therefore, lead wires, such as two lead wires at a time, of the thin film thermosensitive element 1 for measurement, the thin film thermosensitive element 2 for protective heating, and the thin film thermosensitive element 32 for the temperature control element are, for example, inserted to the holes 31a and holes of the substrate of the thin film thermosensitive element 32 for the temperature control element to be guided toward the side of the control process part 5. Moreover, since these holes, like the holes 21a for the thin film thermosensitive element 2 for protective heating, are formed in linear symmetry, it is possible to maintain favorable thermal balance.

The thin film thermosensitive element 32 for the temperature control element substantially has the same configuration as the thin film thermosensitive element 1 for measurement, but the specifications and properties thereof may be the same as or different from each other, and can be properly designed and selected.

In addition, a heat insulating layer $S_2$ is interposed between the thin film thermosensitive element 32 for the temperature control element and the thin film thermosensitive element 2 for protective heating. The heat insulating layer $S_2$ has substantially the same configuration as the heat insulating layer $S_1$, and is an air layer. In addition, through a ring-shaped heat insulating spacer 25 provided between the thin film thermosensitive element 2 for protective heating and the thin film thermosensitive element 32 for the temperature control element, an interval therebetween is maintained. The layer thickness dimension of the heat insulating layer $S_2$ is set at an interval of 1 mm to 3 mm. The layer thickness dimension of the heat insulating layer $S_2$ is formed to be greater than the layer thickness dimension of the heat insulating layer $S_1$. Although the heat insulating layer $S_2$ may be an air layer, the heat insulating layer $S_2$ may also be a gas layer of nitrogen, argon, etc., and may also be formed by a heating insulating material.

The heat dissipation fin 33 is thermally coupled and electrically connected to the temperature control element 3. For example, by using a material with favorable heat transmission property and electrical conductivity, such as copper, aluminum, etc., a pair of the heat dissipation fins 33 in an elongated cylindrical shape are formed to extend from the temperature control element 3 toward the longitudinal direction. Therefore, the heat dissipation fin 33 has a function of dissipating the heat generated from the temperature control element 3 as well as a function as the electrode of the temperature control element 3.

In addition, at the central part of the pair of heat dissipation fins 33, an insulating partition wall 34 is arranged. The insulating partition wall 34 electrically insulates the heat dissipation fins 33 which also serve as electrodes.

In the temperature measurement device 10 as described above, the outer wall 4 (the shaft of the catheter Ct) thereof may have an outer diameter dimension of 1 mm to 2 mm.

FIG. 4 illustrates a basic connection state of a thin film thermosensitive element Rth, and is a wiring diagram for temperature measurement of the thin film thermosensitive element 1 for measurement, the thin film thermosensitive element 2 for protective heating, and the thin film thermosensitive element 32 for the temperature control element. The thin film thermosensitive element Rth and a fixed resistor R as a limiting resistor are connected in series with a power V, and an output terminal is connected in the middle between the thin film thermosensitive element Rth and the fixed resistor R. The voltage of the output terminal is measured as an output voltage Vout, and the temperature sensed by the thin film thermosensitive element Rth is measured based on the measurement result.

In the following, a block configuration of the temperature measurement device 10 is described with reference to FIG. 5.

In the embodiment, a microcomputer (referred to as "microcomputer" in the following) that is the control process part 5 performing overall control executes a predetermined program to process information. The microcomputer is schematically formed by a CPU 51 having a computing part and a control part, a ROM 52 and a RAM 53 as a memory means, and an input/output control means 54. In addition, a power circuit 55 is connected to the input/output control means 54. In addition, the circuit shown in FIG. 4 is connected to the power circuit 55.

The power circuit 55 includes the power V, and exhibits a function of applying the voltage of the power V to each thin film thermosensitive element Rth to control the supply of power to the thin film thermosensitive element Rth. In addition, a power source controlling the supply of power to the temperature control element 3 is provided at the power circuit 55.

Specifically, the power supplied from the power source in the power circuit 55 is controlled through a program stored in the storage means of the microcomputer. An output voltage Vout is input to the microcomputer and subjected to a computing process to be fed back to the power circuit 55, or output as a measurement output to a measurement output part O/P for processing. The measurement output part O/P is a display means or a printing means. Moreover, an input part I/P is connected to the input/output control means 54. The input part I/P, for example, is an input means such as a switch, a keyboard, etc., and can perform setting by inputting temperature, voltage value, time, etc., as required.

In the following, an application example of the temperature measurement device 10 is described with reference to FIG. 6. An example applied to an endoscope for observing the inside of the human body is shown. A practitioner Tm inserts a tip of an endoscope scope Es from the mouth of a patient Pt to observe and inspect an organ. Here, the catheter Ct is inserted through a pipeline P of the endoscope scope Es, and the thermosensitive part 41 as a probe extends out of the pipeline P. A target lens O and an illumination lens L are provided at the tip of the endoscope scope Es. In addition, an image capturing element not shown herein is provided in the vicinity of the tip. A captured image captured by using the image capturing element is displayed, and the practitioner Tm can make observation.

Therefore, in the endoscopic inspection, as will be described in detail in the following, by bringing the thermosensitive part 41 of the temperature measurement device 10 into contact with the affected area of the patient, the temperature of the affected area is measured, and a thermal response inspection on the affected area is performed, and, for example, it is possible to contribute to tumor diagnosis.

It is noted that the temperature measurement device of the embodiment is not limited to being incorporated into a catheter. The temperature measurement device of the embodiment can be configured as an independent temperature measurement device and measure skin temperature, body temperature, or, in industrial fields, surface temperature of an object.

Figure 7:
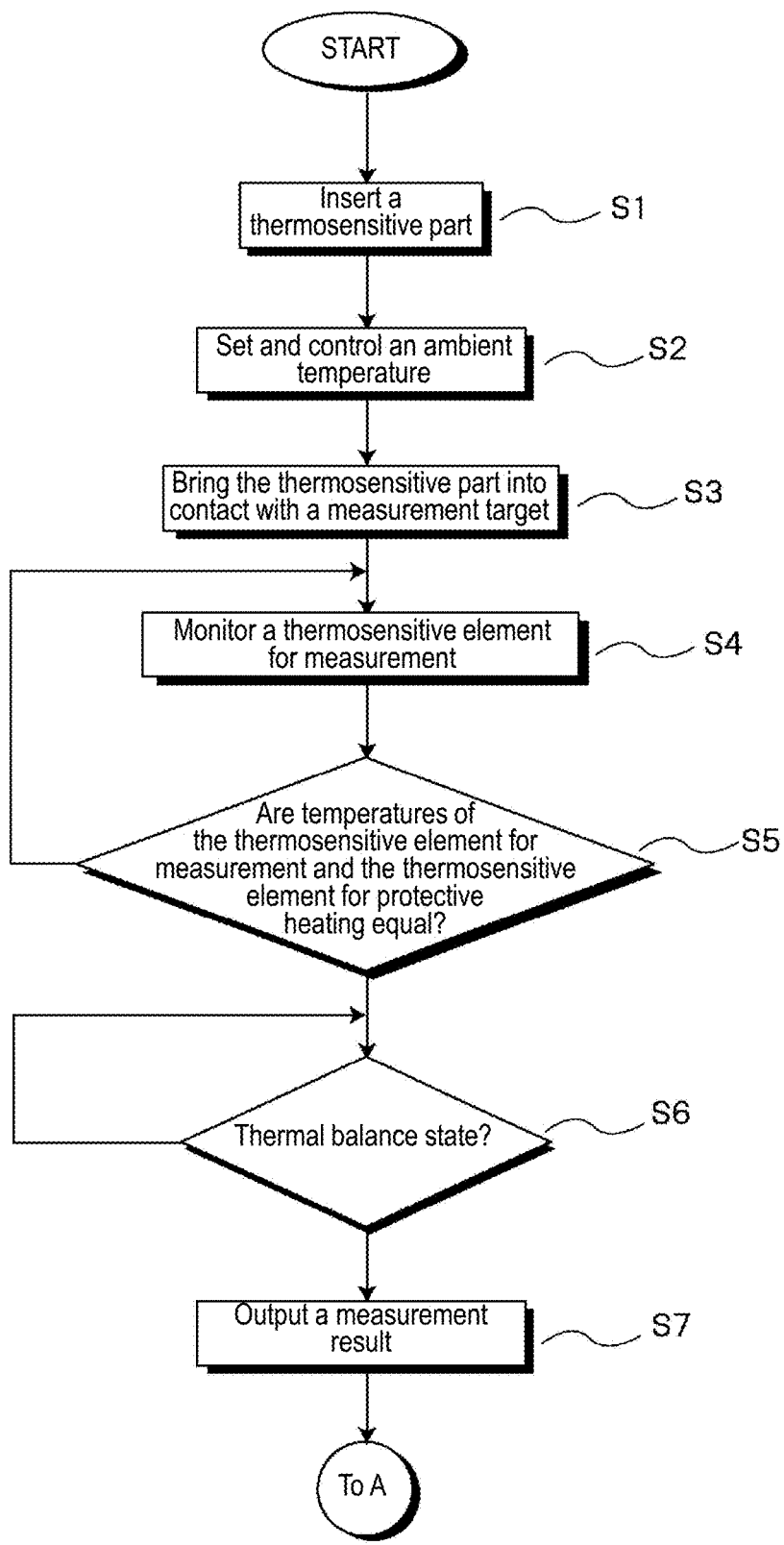
FIG. 7 is a flowchart schematically illustrating temperature measurement.
Figure 8:
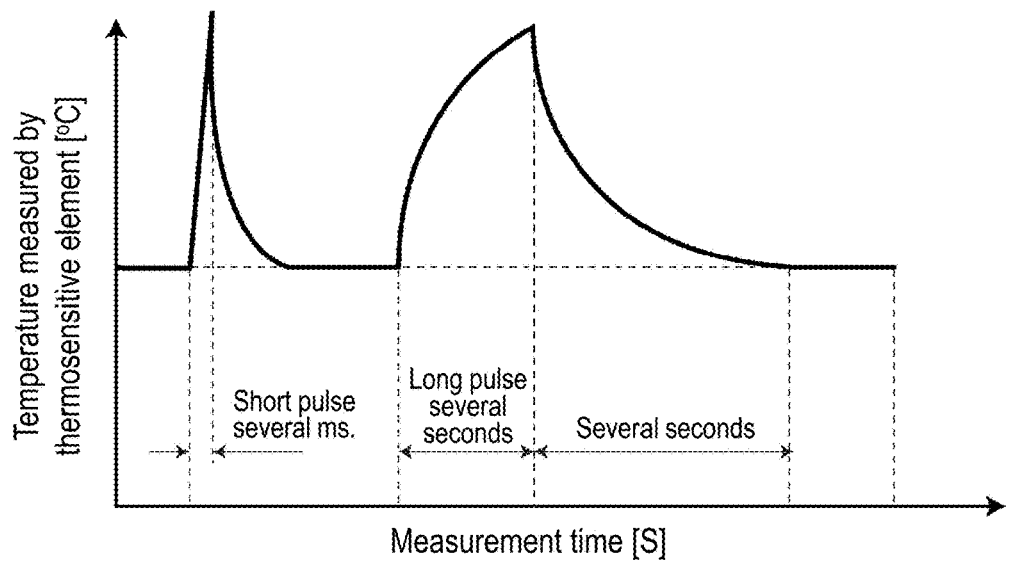
FIG. 8 is a time chart illustrating an image where thermal impulses occur in temperature attenuation measurement.
Figure 9:
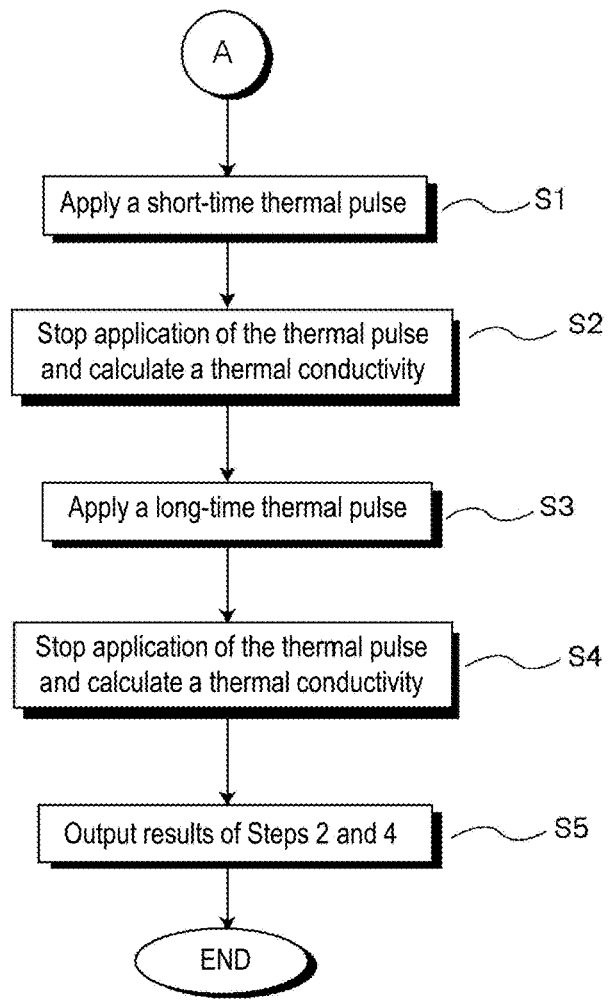
FIG. 9 is a flowchart schematically illustrating temperature attenuation measurement.

In the following, the operation of the temperature measurement device 10 will be described with reference to FIGS. 7 to 9 for a case of measuring the measurement target and for a case of measuring the attenuation of the temperature. FIG. 7 is a flowchart schematically illustrating temperature measurement. FIG. 8 is a time chart illustrating an image where thermal impulses occur in temperature attenuation measurement. In FIG. 8, the horizontal axis represents time (sec.), and the vertical axis represents measurement temperature (t) of the thin film thermosensitive element for measurement. FIG. 9 is a flowchart schematically illustrating temperature attenuation measurement. These operations are mainly executed by the program of the control process part 5 shown in FIG. 5.

<Temperature Measurement>

As shown in FIG. 7, when power is turned on, the temperature measurement device 10 is started, and the thermosensitive part 41 as a probe is inserted into the human body with the endoscope scope Es (Step S1). Then, through the temperature control element 3, the heat sink 31, and the thin film thermosensitive element 32 for the temperature control element, the ambient temperature is set and controlled to a temperature that is a certain degree lower than the measurement target (Step S2). For example, if the temperature of the affected area as the measurement target is 37° C., the ambient temperature is set to a temperature that is 5° C. to 10° C. lower, preferably 2° C. to 3° C. lower.

In the use of the temperature measurement device 10, it is required that, in principle, the ambient temperature, that is, at least the thin film thermosensitive element 1 for measurement, is lower than the temperature of the measurement target. In an environment such as the abdominal cavity or an organ in an endoscopic surgery, since the affected area as the measurement target and the surrounding environment are at the same temperature, it is difficult to precisely and accurately measure the temperature of the affected area.

In the environment, through the Peltier element as the temperature control element 3, the temperature of the heat sink 31 is lowered, and the temperature of the thin film thermosensitive element 1 for measurement can be made substantially lower than the temperature of the measurement target. The heat sink 31 performs temperature control by the temperature control element 3 while being monitored by using the thin film thermosensitive element 32 for the temperature control element, is maintained at a temperature a certain degree lower than the measurement target by several ° C., for example, and makes the thin film thermosensitive element 2 for protective heating self-heat to enable heat exchange between the thin film thermosensitive element 1 for measurement and the thin film thermosensitive element 2 for protective heating, so that the temperatures of the thin film thermosensitive element 1 for measurement and the thin film thermosensitive element 2 for protective heating can be equal. The heat generated by the temperature control element 3 is dissipated through the heat dissipation fin 33.

The heat sink 31 can be omitted in the case where the temperature of the measurement target is constantly higher than the ambient temperature. However, by providing the heat sink 31, a stable, more precise temperature measurement can be expected.

Then, the thermosensitive part 41 (the thin film thermosensitive element 1 for measurement) is brought into contact with the affected area of the measurement target (Step S3). In such state, the temperature of the thin film thermosensitive element 1 for measurement is monitored (Step S4), while the temperature of the thin film thermosensitive element 1 for measurement and the temperature of the thin film thermosensitive element 2 for protective heating are controlled to be equal (Step S5).

That is, when the thin film thermosensitive element 1 for measurement is brought into contact with the measurement target, the control process part 5 controls the electrical resistance of the thin film thermosensitive element 2 for protective heating to be equal to the electrical resistance of the thin film thermosensitive element 1 for measurement. Then, the thin film thermosensitive element 2 for protective heating is heated to a temperature equal to the temperature of the thin film thermosensitive element 1 for measurement. Accordingly, since the temperature of the surface of the affected area as the measurement target, the temperature of the thin film thermosensitive element 1 for measurement, and the temperature of the thin film thermosensitive element 2 for protective heating are equal, heat can be prevented from being transferred from the thin film thermosensitive element 1 for measurement to the thin film thermosensitive element 2 for protective heating, or from the surface of the affected area to the thin film thermosensitive element 1 for measurement.

In this way, in the temperature measurement device 10, the thin film thermosensitive element 2 for protective heating is provided, with the heat insulating layer $S_1$ with a suitable layer thickness dimension being interposed, with respect to the thin film thermosensitive element 1 for measurement, the heat flowing in from the surface of the measurement target along the thin film thermosensitive element 1 for measurement and the lead wire, etc., is offset, it is possible to suppress the lost heat amount to the minimum, and temperature measurement can be carried out without changing the state of the measurement target.

Then, that the temperature of the thin film thermosensitive element 1 for measurement and the temperature of the affected area reach a thermal balance state is detected (Step 6), and the measurement result of the temperature of the affected area as the measurement target is recorded and output (Step 7).

The processes of the temperature measurement method mainly include: a step of setting and controlling the ambient temperature to a temperature that is a certain degree lower than the measurement target; a step of bringing the thermosensitive part 41 into contact with the measurement target; a step of exerting control so that the temperature of the thin film thermosensitive element 1 for measurement and the temperature of the thin film thermosensitive element 2 for protective heating are equal; and a step of outputting the measurement result of the temperature of the measurement target.

According to such temperature measurement method of the temperature measurement device 10, the temperature of the measurement target can be precisely and accurately measured. In addition, since the thermal capacity of the thin film thermosensitive element is small, the temperature measurement device 10 is highly sensitive and able to perform measurement with rapid response on the order of milliseconds within a short time.

Regarding Step 2 of setting and controlling the ambient temperature to be a temperature that is a certain degree lower than the measurement target, in industrial fields, if it is assumed that it is in an environment that the ambient temperature is 15° C., whereas the surface temperature of a component as the measurement target is in a cool state of 10° C., by setting and controlling the ambient temperature to a temperature that is a certain degree lower than the measurement target, such as 8° C., a highly precise temperature measurement on the measurement target can be expected.

<Temperature Attenuation Measurement>

As an example, a temperature attenuation measurement method for diagnosing the state of skin cancer or organ cancer in living tissues of the measurement target is described with reference to FIGS. 8 and 9. The temperature attenuation measurement estimates the thermal conductivity of the measurement target in accordance with the so-called thermal pulse attenuation method.

In the embodiment, multiple thermal pulses in which a short-time thermal pulse and a long-time thermal pulse of constant power differ in time are supplied to the thin film thermosensitive element 1 for measurement to generate heat at a predetermined temperature. Then, the temperature change of the surface of the measurement target is measured by using the thin film thermosensitive element 1 for measurement, and the thermal conductivity is calculated from the temperature attenuation after heating. In this case, like the thin film thermosensitive element 1 for measurement, the thin film thermosensitive element 2 for protective heating also generates heat.

Cancer tissues have greater bioactivity, such as metabolism and blood flow, than healthy tissues, and energy that is taken away increases when cancer tissues are heated. Therefore, it is confirmed that an apparent measured thermal conductivity increases, and the greater the volume of cancer tissues, the higher the apparent thermal conductivity. Therefore, it is possible to diagnose a tumor by measuring the apparent thermal conductivity estimated through the temperature attenuation of the affected area. Specifically, the short-time thermal pulse is applied to the affected area, and a cancer activity state of the epidermis is measured from the apparent thermal conductivity estimated from the temperature attenuation thereof, and similarly, the long-time thermal pulse is applied to the affected area, and a cancer activity state in the dermis is measured from the thermal conductivity through the temperature attenuation thereof. In the measurement of the cancer activity state in the dermis, even if the heat penetration depth increases, the influence of the epidermis is still significant. Therefore, the apparent thermal conductivity including information of deeper tissues is measured.

By using such short-time thermal pulse, it can be expected to make great contribution to the diagnosis of early-stage skin cancer. In addition, since the short-time thermal pulse is applied at the same time in addition to the long-time thermal pulse, it is possible to identify the thermophysical properties in the depth direction inside the living body, and thermal properties can be explored in the vicinity of the surface of the living body from the skin surface until as deep as the dermis.

As shown in FIGS. 8 and 9, a short-time thermal pulse (short pulse) of constant power with a duration on the order of several milliseconds is applied, as a first thermal pulse, to the thin film thermosensitive element 1 for measurement (Step S1). Within a predetermined time, that is, several seconds, after the application stops, the thin film thermosensitive element 1 for measurement is monitored to detect a temperature attenuation property and calculate the thermal conductivity (Step S2). Then, a long-time thermal pulse (long pulse) of constant power with a duration longer than the duration of the first thermal pulse is applied as a second thermal pulse (Step S3). Within a predetermined time, that is, several seconds, after the application stops, the thin film thermosensitive element 1 for measurement is monitored to detect a temperature attenuation property and calculate the thermal conductivity (Step S4). The calculation result of the thermal conductivities of Step S2 and Step S4 and the diagnosis results based on the thermal conductivities are output (Step S5).

Therefore, the processes of the temperature attenuation measurement method mainly include: a step of bringing the thermosensitive part into contact with the measurement target; a step of applying the first thermal pulse of constant power to the thin film thermosensitive element for measurement; a step of detecting the temperature attenuation property of the thin film thermosensitive element for measurement within a predetermined time after the application of the first thermal pulse stops; a step of applying the second thermal pulse of constant power with a duration longer than the first thermal pulse to the thin film thermosensitive element for measurement; and a step of detecting the temperature attenuation property of the thin film thermosensitive element for measurement within a predetermined time after the application of the second thermal pulse stops.

According to the temperature attenuation measurement method, by detecting the temperature attenuation properties from the epidermis to the dermis of the living body to calculate the thermal conductivity, the affected area can be diagnosed in a non-invasive manner.

Second Embodiment

Figure 10:
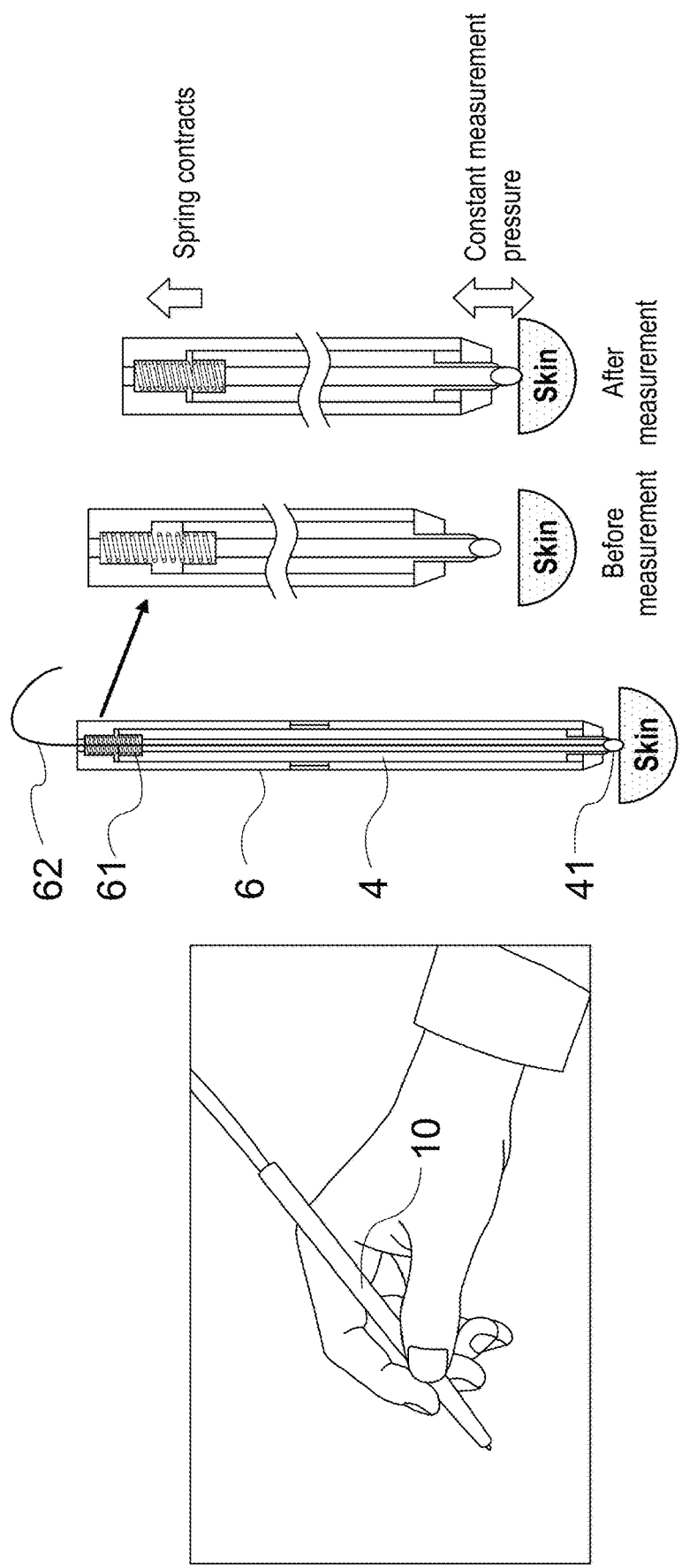
FIG. 10 is a schematic diagram illustrating a temperature measurement device according to a second embodiment of the invention.

In the following, a temperature measurement device according to the second embodiment of the invention is described with reference to FIG. 10. FIG. 10 illustrates an image of the temperature measurement device, and is a schematic view illustrating a measurement state. In addition, portions same as or equivalent to the first embodiment are labeled with the same reference symbols, and repeated description is omitted.

The basic configuration of the embodiment is the same as the first embodiment. The temperature measurement device 10 is configured to be integrated into a pencil-shaped holder 6. The outer wall 4 is a sliding rod, and the sliding rod is slidably accommodated in the holder 6. The tip part of the sliding rod serves as the thermosensitive part 41 as the probe that senses temperature.

In addition, a coil spring 61, as an elastic body, is arranged at the rear end part of the sliding rod. The coil spring 61 makes the thermosensitive part 41 protrude toward the tip direction, that is, the coil spring 61 elastically biases the thermosensitive part 41 toward the direction of the measurement target (e.g., skin surface). Therefore, at the time of measurement, the pressing pressure of the thermosensitive part 41 toward the measurement target is constant, and higher measurement precision can be expected. In addition, a lead wire 62 is guided out from the rear end of the holder 6, and is connected to the control process part.

According to the embodiment, like the first embodiment, a temperature measurement device, a temperature measurement method, and a temperature attenuation measurement method which are capable of precisely and accurately measuring the temperature of the measurement target, such as the surface of skin or the surface of an object, with rapid response, and are capable of retaining the temperature of the thin film thermosensitive element for measurement to a temperature lower than the temperature of the measurement target can be provided. In addition, it is possible to keep the pressing pressure of the thermosensitive part 41 toward the measurement target constant.

Although the temperature measurement device, the temperature measurement method, and the temperature attenuation measurement method according to the embodiments of the invention are suitably applied to the measurement of a living body, such as a thermometer, the invention is not limited thereto. The temperature measurement device, the temperature measurement method, and the temperature attenuation measurement method according to the embodiments of the invention are also applicable to the case of measuring the surface temperature of an object in industrial fields.

The invention is not limited to the configurations of the above embodiments, and various modifications are possible without departing from the scope of the invention. Moreover, the above-described embodiments are presented as examples and are not intended to limit the scope of the invention. These novel embodiments can be embodied in various other forms, and various omissions, substitutions and alterations can be made. These embodiments and modifications thereof are included in the scope and gist of the invention, and are included in the scope of the invention described in the claims and equivalents thereof.

What is claimed is:

1. A temperature measurement device, comprising:
a thermosensitive part, sensing a temperature;
a thin film thermosensitive element for measurement, able to measure a temperature by bringing the thermosensitive part into contact with a measurement target;
a thin film thermosensitive element for protective heating, disposed, with a heat insulating layer being interposed, to be able to exchange heat with the thin film thermosensitive element for measurement, and controlled so as to be equal to the thin film thermosensitive element for measurement in temperature;
a temperature control element, able to set the thin film thermosensitive element for measurement to a temperature state at a temperature that is a certain degree lower than a temperature of the measurement target;
a control process part, controlling the thin film thermosensitive element for measurement, the thin film thermosensitive element for protective heating, and the temperature control element.

2. The temperature measurement device as claimed in claim 1, wherein the thin film thermosensitive element for measurement and the thin film thermosensitive element for protective heating are thin film thermistors.

3. The temperature measurement device as claimed in claim 2, wherein the thin film thermosensitive element for measurement and the thin film thermosensitive element for protective heating comprise: substrates; and conductive layers and thin film element layers formed on the substrates, wherein a thickness dimension of the substrate is formed to be less than or equal to 200 μm.

4. The temperature measurement device as claimed in claim 1, wherein the thin film thermosensitive element for measurement and the thin film thermosensitive element for protective heating have same specifications and properties.

5. The temperature measurement device as claimed in claim 1, wherein the temperature control element is a Peltier element.

6. The temperature measurement device as claimed in claim 1, wherein the heat insulating layer is an air layer, and a layer thickness is formed to be 0.05 mm to 1 mm.

7. The temperature measurement device as claimed in claim 1, wherein the thin film thermosensitive element for measurement, the thin film thermosensitive element for protective heating, and the temperature control element are incorporated into a tip end part of a catheter.

8. The temperature measurement device as claimed in claim 1, wherein the thin film thermosensitive element for measurement, the thin film thermosensitive element for protective heating, and the temperature control element are incorporated into a pencil-shaped holder.

9. The temperature measurement device as claimed in claim 1, wherein the control process part exerts control, so that a first thermal pulse of constant power is applied to the thin film thermosensitive element for measurement, and a second thermal pulse of constant power, which has a duration longer than the first thermal pulse, is applied to the thin film thermosensitive element for measurement.

10. A temperature measurement method, wherein a thermosensitive part sensing a temperature, a thin film thermosensitive element for measurement able to measure a temperature, a thin film thermosensitive element for protective heating disposed, with a heat insulating layer being interposed, with respect to the thin film thermosensitive element for measurement, and a temperature control element able to control a temperature of the thin film thermosensitive element for measurement are provided, the temperature measurement method comprising:

a step of controlling, by using the temperature control element, the temperature of the thin film thermosensitive element for measurement to a temperature that is a certain degree lower than a measurement target;

a step of bringing the thermosensitive part into contact with the measurement target;

a step of exerting control so that the temperature of the thin film thermosensitive element for measurement and a temperature of the thin film thermosensitive element for protective heating are equal; and a step of outputting a measurement result of a temperature of the measurement target.

11. A temperature attenuation measurement method, wherein a thermosensitive part sensing a temperature, a thin film thermosensitive element for measurement able to measure a temperature, a thin film thermosensitive element for protective heating disposed, with a heat insulating layer being interposed, with respect to the thin film thermosensitive element for measurement, and a temperature control element able to control a temperature of the thin film thermosensitive element for measurement are provided, the temperature attenuation measurement method comprising:

a step of bringing the thermosensitive part into contact with the measurement target;

a step of applying a first thermal pulse of constant power to the thin film thermosensitive element for measurement;

a step of detecting a temperature attenuation property of the thin film thermosensitive element for measurement within a predetermined time after application of the first thermal pulse stops;

a step of applying a second thermal pulse of constant power with a duration longer than the first thermal pulse to the thin film thermosensitive element for measurement; and a step of detecting a temperature attenuation property of the thin film thermosensitive element for measurement within a predetermined time after application of the second thermal pulse stops.

* * * * *